Nov. 10, 1970   F. FÖRSCHNER   3,539,282
GEAR PUMP OR MOTOR
Filed April 14, 1969   4 Sheets-Sheet 1

INVENTOR
Friedrich FÖRSCHNER
By
his ATTORNEY

INVENTOR

Friedrich FÖRSCHNER
By his ATTORNEY

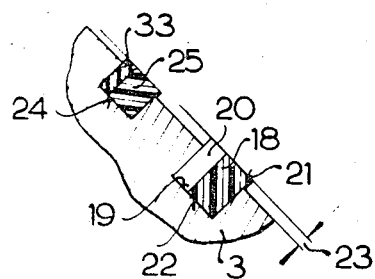
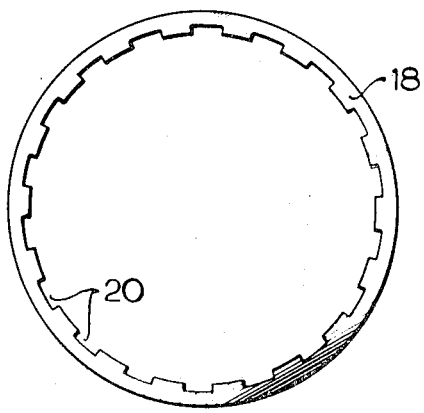
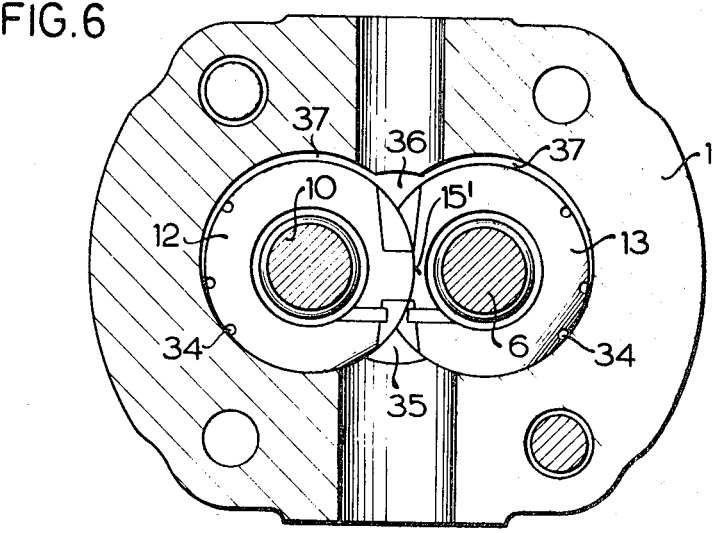

Nov. 10, 1970   F. FÖRSCHNER   3,539,282
GEAR PUMP OR MOTOR
Filed April 14, 1969   4 Sheets-Sheet 4

INVENTOR
Friedrich FÖRSCHNER
By
his ATTORNEY

United States Patent Office 3,539,282
Patented Nov. 10, 1970

3,539,282
GEAR PUMP OR MOTOR
Friedrich Förschner, Waiblingen, Germany, assignor to Robert Bosch G.m.b.H., Stuttgart, Germany
Filed Apr. 14, 1969, Ser. No. 816,881
Claims priority, application Germany, Apr. 13, 1968, 1,703,180; Oct. 10, 1968, 1,802,289
Int. Cl. F04c 1/08, 27/00
U.S. Cl. 418—132
20 Claims

ABSTRACT OF THE DISCLOSURE

A gear pump or motor in which at least one of the bearing means in which the shafts of the gears are journaled is movable in axial direction and sealingly pressed by fluid pressure against the respective end faces of the gears.

BACKGROUND OF THE INVENTION

The present invention relates to a gear pump or gear motor having a pair of gears in mesh with each other, in which the shafts of the gears are journaled in bearing means abutting against end faces of the gears, in which at least one of the bearing means is axially movable and sealingly pressed by fluid pressure against the corrsponding end faces of the gears, and in which on the side of the one bearing means which faces away from the gears a plurality of pressure fields separated from each other by sealing means are maintained at different pressure, which pressure fields communicate through passage means with spaces between the teeth of the gears.

A gear pump is known in the art in which the two shafts of the gears are mounted in bearing bushings, and in which the bearing bushings located at the driven side of the pump are axially movable and are pressed by fluid pressure against the end faces of the gears in such a manner so as to sealingly contact the latter. A plurality of partial fields are for this purpose arranged in a plane between the end faces of the bushings which face away from the gears and the cover of the pump housing, which fields are limited by sealing means arranged about the outer contour of the bushings substantially in the form of the figure 8. The partial fields which are of substantially oval form are arranged as recesses in the sealing means about the shafts of the gears. The pressure medium passes into the pressure fields through bores extending through the flanges of the bushings. At the high pressure side of the pump, that is to one side of the meshing portions of the gears is a high pressure field. The pressure in the partial pressure fields decreases according to the pressure drop in the spaces between the teeth of the gears toward the low pressure side of the pump, that is, at the low pressure side a low pressure field will be maintained.

This known arrangement has the disadvantage that the partial fields serve only to provide an axial force compensation in that each partial field communicates only with one space between adjacent teeth of the gears. The pressure built up in these spaces will thereby not be affected.

SUMMARY OF THE INVENTION

It is an object of the present invention to provide for a gear pump or motor which is characterized by its quiet operation and in which the axial sealing of the spaces between the gears will occur according to the operating condition of the machine existing at any instance.

It is a further object of the present invention to provide for a gear pump or motor of the aforementioned kind which is simple in construction so that it can be manufactured at reasonable cost and will stand up properly during extended use.

With these and other objects in view, the gear pump or motor according to the present invention, mainly comprises housing means defining a chamber having a pair of arcuate peripheral surface portions and opposite closed ends, an inlet passage for feeding fluid in said chamber and an outlet passage for discharging fluid therefrom, a pair of meshing gears in said chamber and defining in the latter between the gears and one passage a high pressure side and between the gears and the other passage a low pressure side, a pair of shafts coaxially fixed to the gears and respectively projecting beyond opposite end faces of the latter, bearing means in the chamber between the closed ends of the housing means and respective end faces of the gears and mounting the shafts rotatable about their axes, at least one of said bearing means being movable in axial direction and being pressed by fluid pressure in sealing engagement against corresponding end faces of the gears, sealing means between the end face of the said one bearing means which faces away from the gears and the corresponding closed end of the housing and forming between the aforementioned end face and the closed end of the housing a plurality of pressure fields, passage means providing communication between the spaces between the gear teeth and the peripheral surface portions of the housing and comprising a gap extending in axial direction along the outer surface of the one bearing means. The gap extends in circumferential direction along the high pressure side and ends short of the low pressure side so that the pressure fields will be maintained at different pressures.

This arrangement has the advantage that the pressure in the spaces between the gear teeth will gradually build up through hte gap through a very large angle of rotation of the gears, whereby the operating noise of the apparatus will be essentially reduced. An additional advantage of the arrangement is that the axial surplus force resulting from the axial pressure fields may be held by means of the gap in connection with axial grooves on the bearing means within very narrow limits corresponding to the operating conditions of the machine. In this way excessive friction between the bearing means and end faces of the gears, which would be produced by pressing the bearing means with excessive force against the gear end faces, can be avoided. The pressure with which the bearing means are pressed against the end faces of the gears, is however, maintained in such a manner to produce a good sealing effect between the abutting faces of the bearing means and gears.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a cross-section taken along the line IV—IV of FIG. 2 and drawn to an enlarged scale;
FIG. 5 is a front view of a sealing ring used in the machine of FIG. 1 and illustrating the sealing ring in unstressed conditions;

FIG. 6 is a cross-section similar to FIG. 3 of a second embodiment;

DESCRIPTION OF THE PREFERRED EMBODIMENTS

Figure 1:
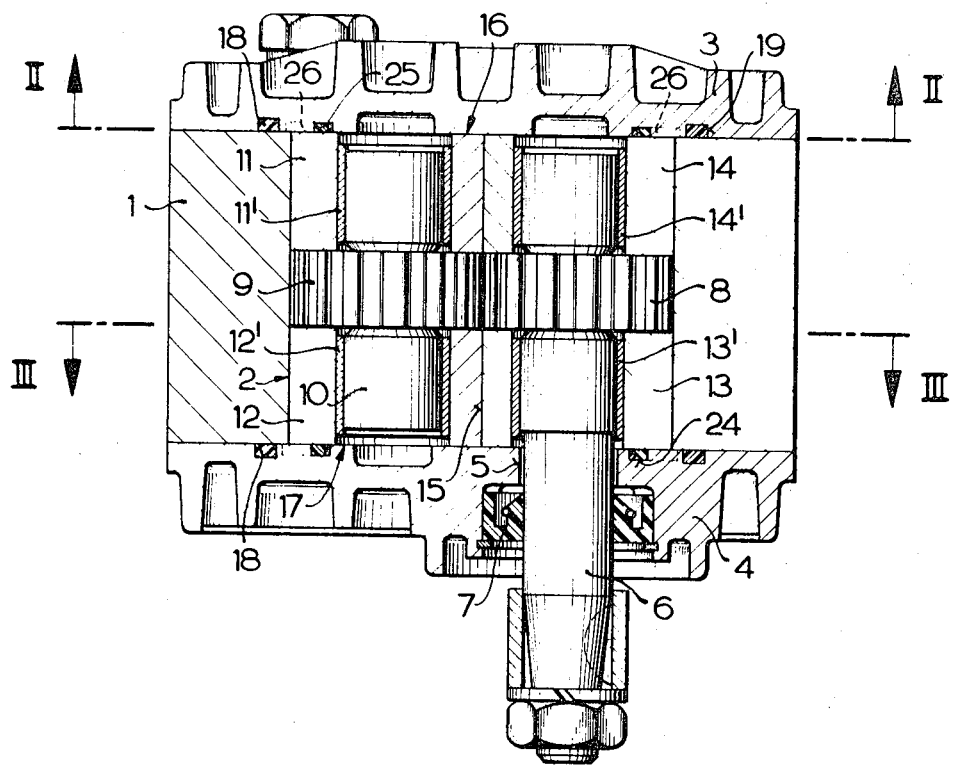
FIG. 1 is an axial section through a gear pump or motor according to the present invention.
Figure 2:
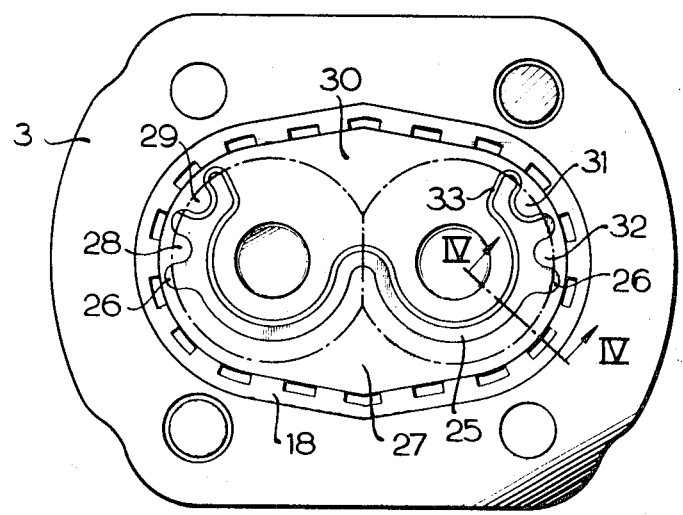
FIG. 2 is a cross-section taken along the line II—II of FIG. 1 and viewed in the direction of the arrows.
Figure 3:
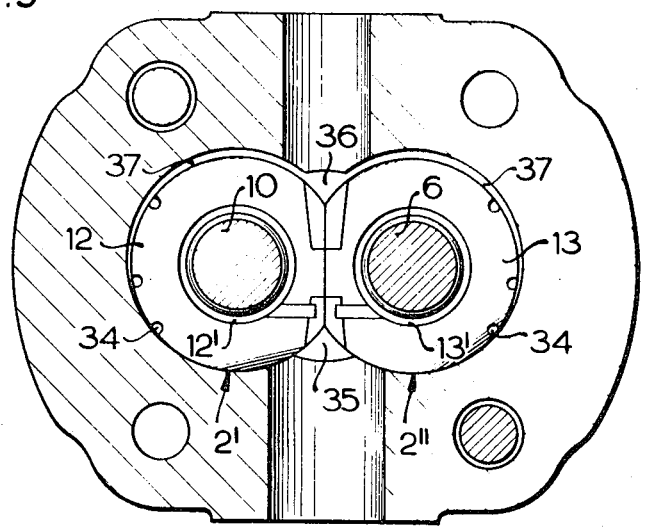
FIG. 3 is a cross-section taken along the line III—III of FIG. 1 and viewed in the direction of the arrows.

Referring now to the drawings, and more particularly to FIGS. 1–3 of the same, it will be seen that the rotary apparatus which may be operated as gear pump or gear motor may comprise a housing means 1 defining a chamber 2 formed by a pair of axially extending partly overlapping bores 2' and 2". The chamber 2 is closed at opposite ends by a pair of covers 3 and 4 which are fixedly connected to opposite end faces of the housing by screws or the like. A bore 5 is formed through the cover 4. A shaft 6 extends through the bore 5 and a seal 7 in the bore 5 serves to seal the shaft 6.

A pair of gears 8 and 9 are arranged in the chamber 2 and the shafts 6 and 10 of the gears are journaled in bearing bushings 11, 12, 13 and 14. Slide bushings 11'–14' are respectively pressed into the bores of the bushings 11–14 and the slide bushings are formed of material having good sliding characteristics. The bearing bushings 11–14 have cylindrical form and their outer diameter is slightly smaller, for instance 0.2 millimeter smaller, than the diameter of the bores 2' and 2". The outer diameter of the bushings correspond substantially to the outer diameter of the gears 8 and 9. Each bushing has at one side thereof a flat 15, which extends over the whole length of the respective bushings and the flats of corresponding bushings abut against each other in the region in which the bores 2 and 2' intersect with each other. The bushings 11–14 are axially movable and each abuts with one end face thereof against the corresponding end face of the gears. The length of the bushings 11–14 are so dimensioned that the length of the bushings to opposite sides of each gear together with the width of the respective gears corresponds substantially to the axial length of the chamber 2, except for a small axial clearance.

Between the end faces of the bushings which face away from the gears and the cover 3, respectively the cover 4 remains thus a small clearance space 16, respectively 17, which is sealed in radially outward direction by an endless sealing ring 18 arranged in grooves 19, respectively formed in the covers 3 and 4.

Each sealing ring 18 has a rectangular cross-section and in unstressed condition, that is before being placed in the respective groove 19 a circular shape, as shown in FIG. 5. Each sealing ring 18 is preferably formed at the inner peripheral surface thereof with a plurality of spaced grooves or cut-outs 20 of substantially rectangular configuration which extend parallel to the axis of the ring. The end faces or sealing faces 21 and 22 of the ring 18, which are located in parallel planes normal to the axis, are therefore not interrupted.

The thickness of the sealing ring 18 is in axially uncompressed condition by a dimension 23, shown in FIG. 4, greater than the depth of the groove 19 in which the sealing ring is inserted. The excess height 23 is greater than would be normally necessary in order to obtain a compression of the ring which would assure a proper seal. The additional volume resulting from the excess height 23 of the sealing ring is displaced during tight assembly of the housing parts into the cut-outs or grooves 20 of the ring 18 so that the groove 19 in which the ring is located is at least at spaced portions thereof completely filled by the compressed material of the ring.

The spaces or pressure fields in the clearance spaces 16 and 17 which are limited in radial outward direction by the endless sealing rings 18 are divided into smaller partial fields 27–32 by sealing means 25 which are respectively located in grooves formed in the covers 3 and 4.

The sealing means 25 are formed by two integrally connected circular segments respectively arranged radially outwardly of the shafts 6 and 10 and surrounding about two-thirds of the circumference of the latter so that sealing means 25 are substantially in the form of the figure 3. Each of the circular segments of the sealing means 25 is provided further with three radially outwardly projecting fingers 26 which respectively limit the partial pressure fields 28, 29 and 31, 32. The fingers 26 preferably have a length so that they extend beyond the outer periphery of the bushings 11–14 toward the endless sealing ring 18, but spaced a small distance from the inner periphery of the latter. The sealing means 25 has a substantially rectangular cross-section, but the edges thereof which are located at the bottom of the groove 24 are provided with radii, as shown in FIG. 4, whereas the two other edges thereof are sharp-edged. A strip 33 from suitable plastic material, such as polyamide, extending over the whole height of the sealing means 25 is arranged along one side face of the grooves 24 and on the side of the sealing means 25 which faces the partial field 30. The strip 33 encompasses completely the two fingers 26 arranged at the ends of the circular segments and in part the fingers 26 which limit the partial fields 28, 29, respectively 31, 32 and the ends of the strip 33 are respectively located at the outer ends of the middle fingers. The strip 33 supports the sealing means 25 which are formed from softer material than the strip 33.

Each of the partial pressure fields 28, 29 and 31, 32 is connected by channels 34, which are formed by grooves extending parallel to the axis of the bushings 11–14 in the outer peripheral surface of the latter, with portions at the end faces of the bushings which face the gears 8 and 9. The partial field 27 is connected through a channel 36 directly with the high pressure side and the partial field 30 through a channel 35 with the low pressure side in the chamber 2. It is understood that when the machine is operated as pump the fluid inlet passage communicates with the channel 35, whereas the fluid outlet passage, in which the fluid is under high pressure, communicates with the channel 36, whereas when the machine is operated as motor fluid under high pressure is fed into the passage communicating with the channel 36 and in this case the passage communicating with the channel 35 will form the outlet passage of the machine.

A second embodiment is illustrated in transverse cross-section in FIG. 6. As shown in FIG. 6, the bushing 12 and the coaxial bushing not illustrated in this figure are formed as full cylinders, whereas the bushing 13 and the bushing coaxially therewith are formed wtih a circular cutout 15' in which portions of the other bushings are perfectly fitted. The bushings are secured against turning about their axes by a pin connection not shown in the drawing.

The bushings 11–14 are pressed by fluid pressure during the operation of the machine against surface portions of the bores 2 and 2' which are located at the low pressure side. In this way wedge-shaped gaps 37 are formed between the outer surfaces of the bushings 11–14 and the surface defining the chamber 2, which gaps diminish toward and end short of the low pressure side.

The pressure fluid passes in small amounts through the wedge-shaped gears 37 to the spaces between the teeth of the rotating gears as well as to the partial fields 28, 29 and 31, 32. The grooves in the outer surfaces of the bushings which form the channels 34 serve for additional admission of fluid to the partial pressure fields. The partial pressure fields are thus maintained respectively at pressures depending on the operating conditions of the machine, the partial field 30 is maintained at low pressure, the partial fields 29 and 31 are maintained at a lower, the partial fields 28, 32 under a higher intermediate pressure and finally the partial field 27 is maintained at high pressure. The force acting in the partial fields is always slightly greater than the force produced by the pressure medium on the end faces of the bushings 11–14 which face the corresponding end faces of the gears. In this way, the bushings 11–14 are pressed in sealing engagement with the corresponding end faces of the gears.

In each of the partial fields 27, 28, 29 and 30 and correspondingly in the fields 27, 32, 31 and 30 is a pressure maintained which differs from the pressure in the adjacent field. A squeezing of the sealing means 25 out of the grooves 24 into the clearance spaces 16 and 17, which could occur under the influence of fluid pressure, which is higher on one side of the sealing means 25 than on the other side thereof, is prevented by the reinforcing strips 33 of plastic material arranged on the respective side of the sealing means.

The form of the endless sealing rings 18 prevents flow of the pressure medium along these sealing rings, for instance in the grooves 19, toward the partial field 30 which is maintained at low pressure, since the grooves are at least in portions thereof completely filled so that no fluid may pass through the grooves, which with commonly used sealing rings is often not the case when these sealing rings are not located in exact dimensioned grooves.

When during operation of the machine as a pump, a space between adjacent gear teeth which is filled with pressure fluid moves from the side of the inlet passage at which the fluid is still at low pressure, into the region of the first partial pressure field 31 or 29, than the pressure medium in this partial field, which is maintained at a slightly higher pressure, will be subjected to a pressure equalization, whereas the pressure in the respective space between the teeth will rise slightly at the same time. Since the gradually widening gap 37 provides continuous communication between the spaces between adjacent teeth, the partial fields and the high pressure side, a continuous gradually increasing build up of pressure in the spaces between the gear teeth will be obtained during rotation of the gears. This "pre-control" of the pressure in the spaces between the gear teeth results in an essential lowering of the operating noise of the machine as well as in an improvement of the volumetric efficiency of the latter.

Figure 7:
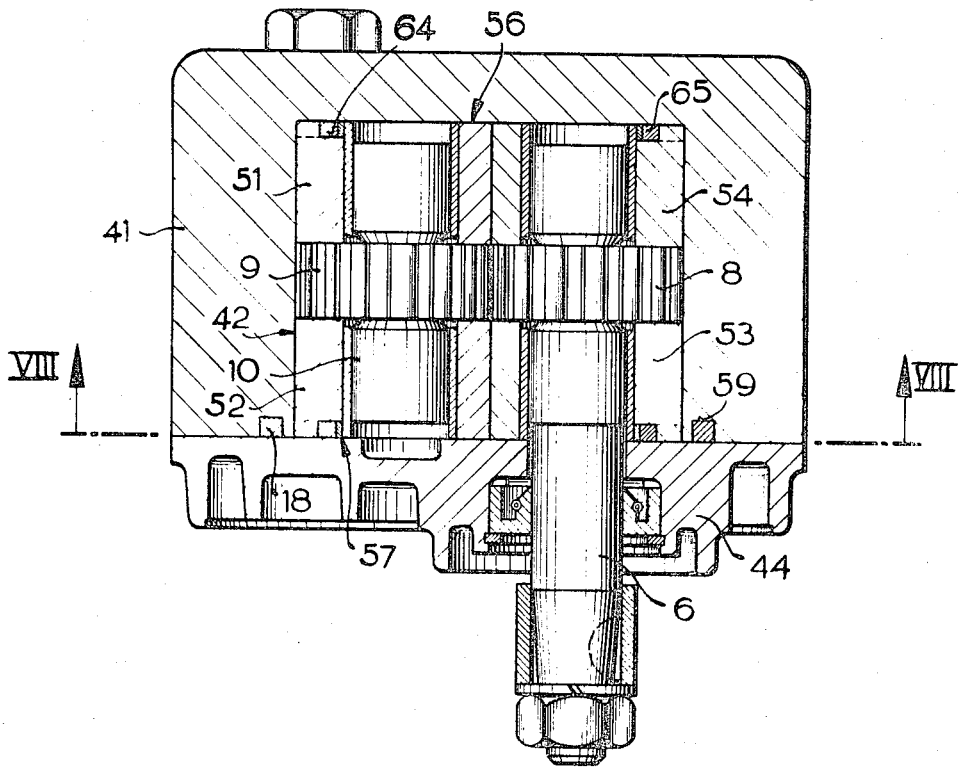
FIG. 7 is an axial cross-section of a third embodiment.
Figure 8:
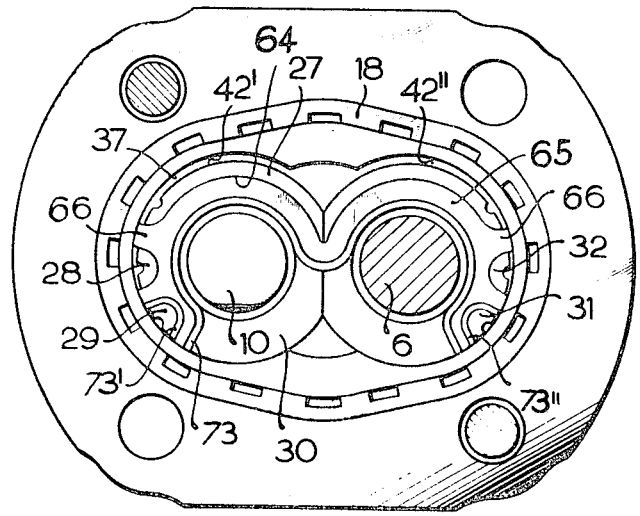
FIG. 8 is a cross-section taken along the line VIII—VIII of FIG. 7 and viewed in the direction of the arrow.

FIGS. 7 and 8 illustrate a third embodiment of the gear pump or motor according to the invention. In this embodiment the housing 41 is cup-shaped with a chamber 42 formed by the partially interesecting bores 42' and 42". The open end of the housing 41 is closed by a cover 44. The shafts 6 and 10 of the two gears 8 and 9 which are arranged in the chamber 42 are journaled in the bushings 51, 52, 53 and 54. These bushings correspond substantially to the bushings 11–14. Between the end faces of the bushings 51–54 which face away from the gears and the bottom of the cup-shaped housing 41, respectively the inner face of the cover 44, are again small clearance spaces 56 and 57. The clearance space 57 at the cover 44 is sealed in outward direction by an endless sealing ring 18 located in the groove 59. The groove 59 is formed at the face of the cover 44 which abuts against the corresponding end face of the housing 41 and this groove encompasses the bores 42' and 42" with a small clearance.

The pressure fields respectively formed in the clearance spaces 56 and 57 are divided by sealing means 65 in a plurality of small partial fields 27–32. Each of the sealing means 65 is located in a groove 64 which extends in an uninterrupted curve along the end faces of the bushings 51, 54, respectively 52 and 53, which face away from the corresponding end faces of the gears.

The sealing means 65 corresponds essentially to the sealing 25 described above. The radially extending fingers 66 have such a length that they extend beyond the outer peripheries of the pushings 51–54 to abut substantially at right angles against the surfaces defining the bores 42' and 42". Strips 73, 73' and 73" formed from plastic material and extending over the whole height of the sealing means 65 are again arranged in the groove 64. The strips 73, 73' and 73" are respectively arranged on the side faces of the groove 64 which face the partial fields 30, 29 and 31. In the same manner, it is also possible to arrange strips 73' and 73" on the side faces of the grooves 64 which face the partial field 28 and 32. The strips 73, 73' and 73" support, in the same manner as the strips 33 described above, the sealing means 65.

The arrangement of the partial fields as well as the function of the machine corresponds otherwise to the arrangement and function as described above.

It is to be understood that the above-described pressure fields may be formed only at the outer end faces of the set of bushings which are located to one side of the gears. It is further to be understood that bearing means of different configuration than the above described may be used in the machine according to the present invention and instead of separate bushings substantially spectacle-shaped bearing plates may be used.

The gap between the bushings and the inner surface of the housing need not necessarily be wedge-shaped, this gap may also be formed in the inner surface of the housing. In addition, radially extending projections may be provided on the bushings or bearing bodies, respectively on the surface of the housing, arranged in such a manner so as not to interrupt the flow of pressure medium in the gap, and fixing the position of the bushings or bearing bodies in the housing.

It is also to be understood that the sealing ring 18 shown in the first two embodiments (FIGS. 1–6) may also be arranged in a groove formed at the end face of the housing as illustrated in the third embodiment. If the sealing rings 18 and the grooves in which the same are arranged are manufactured to very close tolerances, it is not necessary to provide the sealing rings with cut-outs 20 as shown in FIG. 5, however, such cut-outs will permit to manufacture the sealing rings and the grooves with greater tolerances and therefore cheaper and in this case the thickness of each sealing ring should be more than normally greater than the depth of the respective groove. This increase of the thickness will assure proper compression of the sealing ring in axial direction, which is essential for a proper seal, especially since the volume of the ring will increase or reduce through swelling or during change of temperature.

It will be understood that each of the elements described above, or two or more together, may also find a useful application in other types of gear pumps or motors differing from the types described above.

While the invention has been illustrated and described as embodied in a gear pump or gear motor in which the bearing means for the shafts of the gears are pressed by fluid pressure against end faces of the gears, it is not intended to be limited to the details shown, since various modifications and structural changes may be made without departing in any way from the spirit of the present invention.

What is claimed as new and desired to be protected by Letters Patent is set forth in the appended claims:

1. A gear pump or motor comprising, in combination, housing means defining a chamber having a pair of arcuate peripheral surface portions and opposite closed ends, an inlet passage for feeding fluid in said chamber and an outlet passage for discharging fluid therefrom; a pair of meshing gears in said chamber and defining in the latter between said gears and one passage a high pressure side and between the gears and the other passage a lower pressure side; a pair of shafts coaxially fixed to said gears and respectively projecting beyond opposite end faces of the latter; bearing means in said chamber between said closed ends of said housing means and respective end faces of said gears and mounting said shafts rotatable about their axes, at least one of said bearing means being movable in axial direction and being pressed by fluid pressure in sealing engagement against corresponding end faces of said gears; sealing means between the end face of said one bearing means which faces away from said gears and the corresponding closed end of said housing and forming between said one end face of said one bearing means and said corresponding end of said housing a plurality of pressure fields; and passage means providing communication between the spaces between the gear teeth and said pressure fields and comprising a gap extending in axial direction along the outer surface of said one bearing means, said gap extending in circumferential direction along the high pressure side and ending short of said low pressure side whereby said pressure fields will be maintained at different pressures.

2. A structure as defined in claim 1, wherein said sealing means extend in radial direction at least up to said gap.

3. A structure as defined in claim 1, wherein said sealing means extend in radial direction beyond said gap.

4. A structure as defined in claim 1, wherein said gap is formed in the outer peripheral surface of said bearing means.

5. A structure as defined in claim 1, wherein said gap is formed in said arcuate peripheral surface portions of said chamber.

6. A structure as defined in claim 1, wherein said gap is formed by arranging said bearing means with radial clearance in said chamber.

7. A structure as defined in claim 1, wherein the width of said gap is greatest at the high pressure side and decreases uniformly toward said low pressure side.

8. A structure as defined in claim 1, wherein said sealing means are arranged in a first groove and comprise two connected arcuate portions partially surrounding said shafts and a plurality of radially outwardly extending portions integral with said arcuate portions and projecting beyond the outer periphery of said bearing means, said radially outwardly extending portions defining between themselves a large pressure field at said low pressure side, a large pressure field at said high pressure side, and a plurality of smaller pressure fields therebetween which are maintained at pressures between those maintained at said high pressure and said low pressure side.

9. A structure as defined in claim 8, including additional sealing means comprising an endless sealing ring arranged in a second groove, said sealing ring being out of contact with said radially extending portions of said first sealing means and arranged radially outwardly of said bearing means.

10. A structure as defined in claim 9, wherein said first groove is formed in that end face of said bearing means which faces away from said gears.

11. A structure as defined in claim 9, wherein said first and said second grooves are formed in the same part of said housing means.

12. A structure as defined in claim 9, wherein said endless sealing ring has in uncompressed condition a height greater than the depth of said second groove, and wherein said sealing ring is formed at its face facing said first sealing means with a plurality of spaced axially extending cut-outs.

13. A structure as defined in claim 12, wherein said cross-section of said endless sealing ring is rectangular and wherein said cut-outs extend through the whole thickness of the sealing ring and are of rectangular cross-section.

14. A structure as defined in claim 13, wherein said housing means comprises at least one cover closing that end of said housing means which faces said at least one bearing means and wherein said first and second groove are formed in said cover, said grooves being open toward the end face of said at least one bearing means which faces said cover.

15. A structure as defined in claim 9, wherein said sealing means has a substantially rectangular cross-section and wherein the edges of said sealing means at the bottom of said first groove are rounded and the opposite edges are angular.

16. A structure as defined in claim 1, wherein said sealing means has a substantially rectangular cross-section and including a strip engaging at least part of that peripheral surface of said sealing means which faces the side of lower pressure, said strip extending at least over part of a portion of the height of said sealing means to plastic material, especially polyamide.

17. A structure as defined in claim 1, wherein said bearing means comprise a pair of spectacle-shaped bearing plates.

18. A structure as defined in claim 1, wherein said bearing means comprise two pairs of substantially cylindrical bearing bushings, the bushings of each pair being formed with a flat extending over the whole length of the respective bushing and engaging the flat of the other bushing of the pair.

19. A structure as defined in claim 1, wherein said bearing means comprise two pairs of substantially cylindrical bearing bushings, the bushings coordinated with one gear being formed in the peripheral surface thereof with a cut-out having a cross-section in the form of a circular sector and extending in axial direction over the whole length of the respective bushings and the bushings coordinated with the other gear having cylindrical portions fitting exactly into said cut-outs, said bushings being secured against turning about their axes.

20. A structure as defined in claim 1, wherein said bearing means comprise two pairs of substantially cylindrical bearing bushings, the bushings of each pair being formed with a flat extending over the whole length of the respective bushing and engaging the flat of the other bushing of the pair and wherein said sealing means are located in grooves forming end faces of said bushings which face away from the gears, said grooves forming an uninterrupted curve in said end faces of said bushings.

References Cited

UNITED STATES PATENTS

| | | |
|---|---|---|
| 2,714,856 | 8/1955 | Kane. |
| 2,748,454 | 6/1956 | Compton. |
| 2,809,592 | 10/1957 | Miller et al. |
| 2,853,952 | 9/1958 | Aspelin. |
| 2,876,705 | 3/1959 | Aspelin et al. |
| 3,213,799 | 10/1965 | Trick. |
| 3,371,615 | 3/1968 | Pettyjohn et al. |

MARK NEWMAN, Primary Examiner

W. J. GOODLIN, Assistant Examiner

U.S. Cl. X.R.

418—205